United States Patent [19]

Kan et al.

[11] Patent Number: 4,721,495
[45] Date of Patent: Jan. 26, 1988

[54] AUTOTENSIONER

[75] Inventors: Yoshiro Kan, Fujisawa; Isao Sato, Sagamihara; Toshiki Watanabe, Kamakura, all of Japan

[73] Assignee: Nippon Seiko Kabushiki Kaisha, Tokyo, Japan

[21] Appl. No.: 901,257

[22] Filed: Aug. 28, 1986

[30] Foreign Application Priority Data

Sep. 1, 1985 [JP] Japan .................. 60-198664
Mar. 26, 1986 [JP] Japan .................. 61-65903
May 21, 1986 [JP] Japan .................. 61-75316[U]

[51] Int. Cl.$^4$ .............................................. F16H 7/12
[52] U.S. Cl. .............................................. 474/135
[58] Field of Search ............................ 474/101–104, 474/109–112, 133, 135

[56] References Cited

U.S. PATENT DOCUMENTS

| 4,033,196 | 7/1977 | Maeda | 474/135 |
| 4,281,557 | 8/1981 | Ohta et al. | 474/135 X |
| 4,473,362 | 9/1984 | Thomey et al. | 474/135 |
| 4,563,167 | 1/1986 | Foster | 474/135 |

FOREIGN PATENT DOCUMENTS

| 2524744 | 12/1976 | Fed. Rep. of Germany . |
| 208343 | 12/1982 | Japan . |
| 49054 | 3/1984 | Japan . |

*Primary Examiner*—Stephen J. Novosad
*Assistant Examiner*—Thuy M. Bui
*Attorney, Agent, or Firm*—Shapiro and Shapiro

[57] ABSTRACT

An autotensioner comprises a fixed portion fixed to a base member, a displaceable device displaceable relative to the fixed portion to bear against a belt, a tension imparting device for biasing the displaceable device to impart a predetermined tension to the belt, and a vibration absorbing system provided between the fixed portion and the displaceable device so as to absorb any fluctuation of the tension of the belt.

12 Claims, 16 Drawing Figures

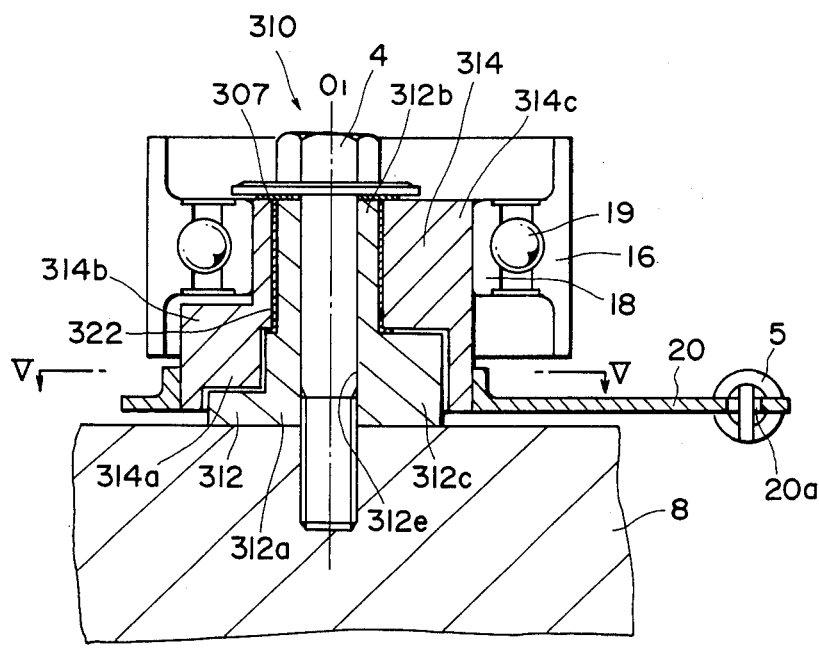
FIG. 9
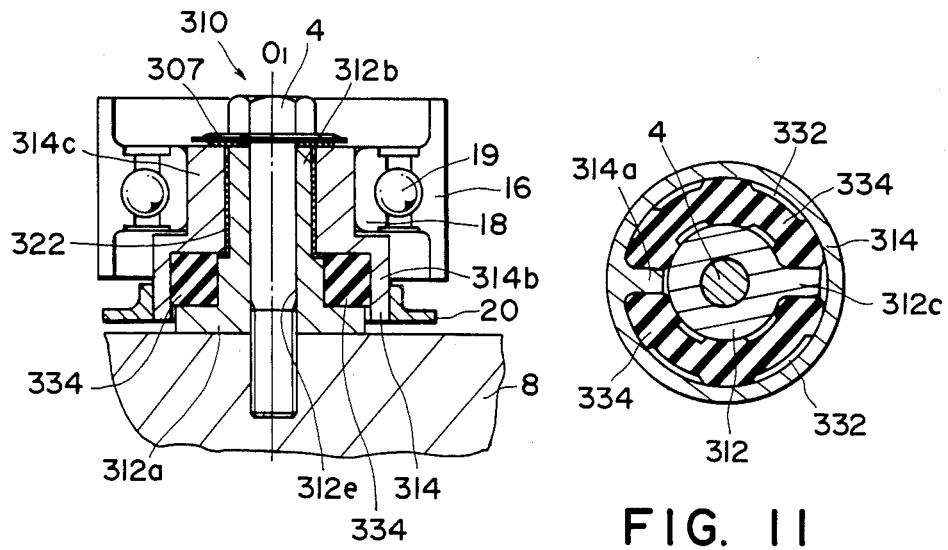
FIG. 10
FIG. 11

AUTOTENSIONER

BACKGROUND OF THE INVENTION

1. Field of the Invention

This invention relates to an autotensioner for maintaining the tension of a belt constant, and more particularly to an autotensioner used to stably maintain the tension of a cam shaft driving timing belt, an auxiliary apparatus driving belt or the like of overhead cam (OHC) or dual overhead cam (DOHC) engines for automobiles.

2. Disclosure of the Related Art

The present invention is widely applicable where it is desired to stably maintain the tension of a belt constant, but the invention will be described with respect to the cam shaft driving timing belt of OHC or DOHC engines for automobiles as an example.

In an OHC or DOHC engine, the cam shaft for opening and closing the intake-exhaust values is located in the upper portion of the engine and lies at a location distant from the crank shaft rotatively driven by a piston(s). Accordingly, a cam shaft driving timing belt is used to transmit the rotation of the crank shaft to the cam shaft. This timing belt has teeth on the inner periphery thereof and is mounted between timing pulleys fixed onto the two shafts while meshing with the outer peripheral teeth of the pulleys and transmits the rotation.

It is necessary to impart a predetermined tension to the timing belt, and heretofore it has been the common practice to impart an initial tension to the timing belt by a fixed type tensioner. The fixed type tensioner is urged against the outer periphery of the timing belt by biasing means such as a spring and after a predetermined initial tension (e.g., 20–30 kg.f) is imparted to the timing belt, the fixed type tensioner is fixed onto the engine block by bolts or the like. This initial tension is imparted chiefly to prevent vibration of the timing belt and tooth skip between the timing belt and the timing pulley. However, the coefficient of linear expansion of the engine block formed of aluminum or like material is about four times as great as that of the timing belt of rubber having a wire embedded therein and therefore, the tension of the belt is greatly varied by a temperature change. That is, during low temperatures, the contraction of the distance between the pulleys is greater than the dimensional contraction of the belt and therefore, slack of the belt occurs and vibration of the belt increases and further, tooth skip may sometimes occur. Also, during high temperatures, the expansion of the distance between the pulleys is greater than the expansion of the belt and therefore, the tension of the belt increases to cause production of noise or reduction in the durability of the belt.

To solve the above-noted problems peculiar to the fixed type tensioner, there has been proposed a tensioner of the type which has the function of compensating for any variation in the tension of the belt (German Laid-Open Patent No. 2524744).

The tensioner of this type is generally called the autotensioner, and the autotensioner of said German Laid-Open Patent is comprised of a fixed portion fixedly held on the engine block, an annular eccentric wheel mounted at an eccentric location on the fixed portion and oscillating relative to and bearing against the belt, and a coil spring biasing the eccentric wheel toward the belt, and follows any fluctuation of the tension of the belt to maintain the tension.

The above-described autotensioner is of a construction in which the eccentric wheel is urged against the belt by the coil spring and therefore, when the load to the belt is great or when the load to the belt increases suddenly (for example, when the engine is started, suddenly stopped, suddenly braked or bites in foreign materials), a great tension or a suddenly increased tension is transmitted to the autotensioner as well and such tension overcomes the biasing force of the coil spring and the tensioner is also displaced together therewith. Moreover, where the rigidity of the coil spring is small, the displacement thereof is sensitive and great and therefore causes the belt to wave and further causes the problem of tooth skip. Particularly, during the starting at a low temperature, the problem of tooth skip is liable to occur.

Also, to provide a construction in which it is difficult for the tensioner to be displaced for a sudden increase in the tension of the belt, use may be made of a coil spring of high rigidity, but in this case, displacement is insensitive to the increase in belt tension occurring during high temperatures and the effect of alleviating the tension is small, thus giving rise to problems such as reduced durability of the belt and noise.

Accordingly, the conventional autotensioner cannot overcome the problem of imparting a moderate tension to the belt by a spring of small rigidity and yet absorbing a sudden increase in the tension of the belt to maintain a stable tension.

On the other hand, the tensioners disclosed, for example, in Japanese Laid-Open Patent Application No. 208343/1982 and Japanese Laid-Open Utility Model Application No. 49054/1984 are of a construction in which an elastic shock absorbing member is disposed in the radial gap between a rotating portion rotatable while bearing against the belt and a fixed portion attached to the engine block, and the shock absorbing member is compressively deformed in accordance with an increase in the tension of the belt to thereby reduce the increase in the tension of the belt.

In the conventional tensioner of the above-described construction, the shock absorbing member is always subjected to the belt tension load and is therefore plastically deformed with the lapse of time. By this plastic deformation of the shock absorbing member, the tension of the belt is reduced and thus, the initial tension cannot be maintained, and this has led to the possibility that problems such as increased vibration of the belt and tooth skip may occur.

SUMMARY OF THE INVENTION

It is an object of the present invention to solve these problems and to provide an autotensioner which can always maintain a stable belt tension.

It is another object of the present invention to provide an autotensioner which can absorb any sudden variation in the tension of the belt and maintain a stable tension while imparting a predetermined tension to the belt.

It is still another object of the present invention to provide an autotensioner which can elastically absorb part of the fluctuation of the tension of the belt.

It is yet still another object of the present invention to provide an autotensioner which can absorb part of the fluctuation of the tension of the belt by the viscosity of fluid.

An autotensioner which achieves the above objects of the present invention comprises a fixed portion fixed to a base member, displaceable means displaceable relative to said fixed portion to bear against a belt, tension imparting means for biasing said displaceable means to impart a predetermined tension to the belt, and vibration absorbing means provided between said fixed portion and said displaceable means so as to absorb any fluctuation of the tension of the belt.

Another autotensioner according to the present invention comprises a fixed portion fixed to a base member, displaceable means displaceable relative to said fixed portion to bear against a belt, tension imparting means for biasing said displaceable means to impart a predetermined tension to the belt and absorbing part of the fluctuation of the tension, plain bearing means for enabling the displacement of said displaceable means relative to said fixed portion and loading the reaction force from the belt, and elastic vibration absorbing means provided between said fixed portion and said displaceable means so as to elastically absorb part of the fluctuation of the tension of the belt.

In the autotensioner of such construction, the reaction force from the belt is loaded to the plain bearing means through an antifriction bearing and therefore, the force by the tension of the belt is not imparted to the elastic vibration absorbing means. The elastic vibration absorbing means, together with the tension imparting means, absorbs any variation in the tension of the belt caused by rotation or temperature change or the vibration of the belt and performs the function of a damper. Accordingly, the elastic vibration absorbing means is very small in the amount of compression and is not plastically deformed as compared with the conventional case and therefore, the autotensioner of the present invention can maintain a stable belt tension.

Still another autotensioner according to the present invention comprises a fixed portion fixed to a base member, displaceable means displaceable relative to said fixed portion to bear against a belt, tension imparting means for biasing said displaceable means to impart a predetermined tension to the belt and absorbing part of the fluctuation of the tension, plain bearing means for enabling the displacement of said displaceable means relative to said fixed portion and loading the reaction force from the belt, and fluid viscosity vibration absorbing means for absorbing part of the fluctuation of the tension of the belt by the utilization of the viscosity of fluid enclosed in the gap between said fixed portion and said displaceable means.

In the autotensioner of such construction, the reaction force of the belt is loaded to the plain bearing means through an antifriction bearing and therefore, the force by the tension of the belt is not imparted to the fluid viscosity vibration absorbing means. The fluid viscosity vibration absorbing means absorbs part of the fluctuation of the tension of the belt resulting from rotation or temperature change by the utilization of the viscous resistance of fluid in a chamber.

The autotensioner of the present invention is provided with the vibration absorbing means for absorbing the fluctuation of the tension of the belt, in addition to the tension imparting means for imparting a predetermined tension to the belt, and therefore can maintain a stable tension for the fluctuation of the tension of the belt, thereby preventing inconveniences such as reduction in the durability of the belt, tooth skip, vibration and noise.

Further, the autotensioner of the present invention is designed such that the ordinary tension of the belt is loaded by the plain bearing and the fluctuation of the tension resulting from temperature change or load fluctuation and the vibration of the belt are loaded by the tension imparting means and the elastic vibration absorbing means and therefore, no excessively great load is applied to the elastic vibration absorbing means and the elastic vibration absorbing means is not plastically deformed and therefore, the autotensioner of the present invention can always maintain a stable belt tension.

The autotensioner of the present invention is designed such that the ordinary fluctuation of the tension of the belt is loaded by the plain bearing and the fluctuation of the tension resulting from temperature change or load fluctuation and the vibration of the belt are absorbed and alleviated by the tension imparting means and the fluid viscosity vibration absorbing means utilizing the viscosity of fluid and therefore, can always maintain a stable belt tension and moreover is simple in construction.

DESCRIPTION OF THE DRAWINGS

FIG. 9 is a cross-sectional view of a third embodiment of the present invention taken along line I—I of FIG. 2.

FIG. 10 is a cross-sectional view of the third embodiment taken along line IV—IV of FIG. 2.

FIG. 11 is a cross-sectional view taken along line V—V of FIG. 9.

DESCRIPTION OF THE PREFERRED EMBODIMENTS

An application of the invention will hereinafter be described in which an autotensioner according to a preferred embodiment of the present invention is utilized for the timing belt of an OHC engine.

Figure 1:
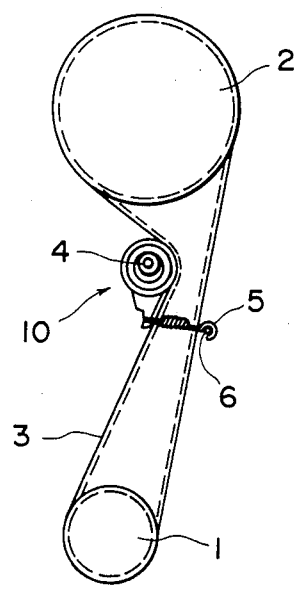
FIG. 1 is a front view of an autotensioner according to a first embodiment of the present invention as it is applied to the timing belt of an OHC engine.

FIGS. 1 to 6 show an autotensioner 10 according to a first embodiment of the present invention. FIG. 1 shows a state in which such autotensioner is applied to the timing belt 3 of an OHC engine.

In FIG. 1, a timing belt 3 is passed over and between a timing pulley 1 for a crank and a timing pulley 2 for a cam shaft which are fixed to the ends of a crank shaft and a cam shaft extending out from an engine block, not shown. The timing belt 3 has teeth on the inner peripheral side thereof and meshes with the outer peripheral teeth of the timing pulleys 1 and 2 to transmit the rotation of the crank shaft to the cam shaft.

The autotensioner 10 is mounted on the engine block so as to impart a predetermined tension (e.g., 20–30 kg.f) to the timing belt 3.

Figure 2:
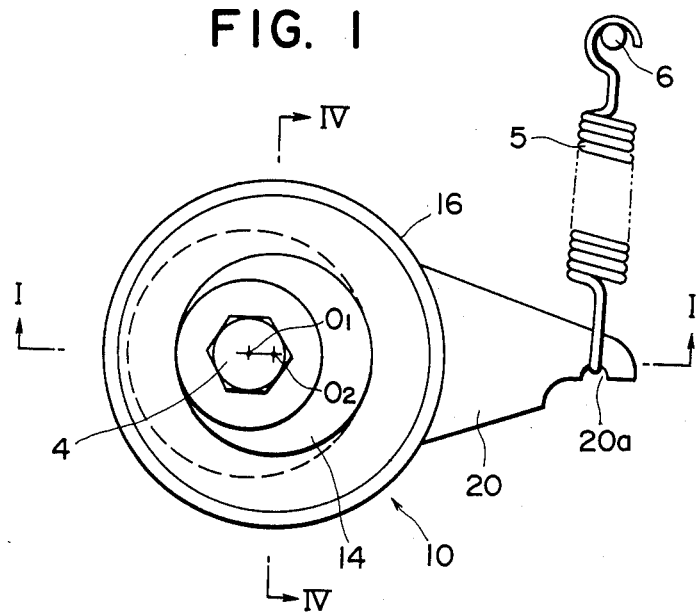
FIG. 2 is an enlarged front view of the first embodiment.
Figure 3:
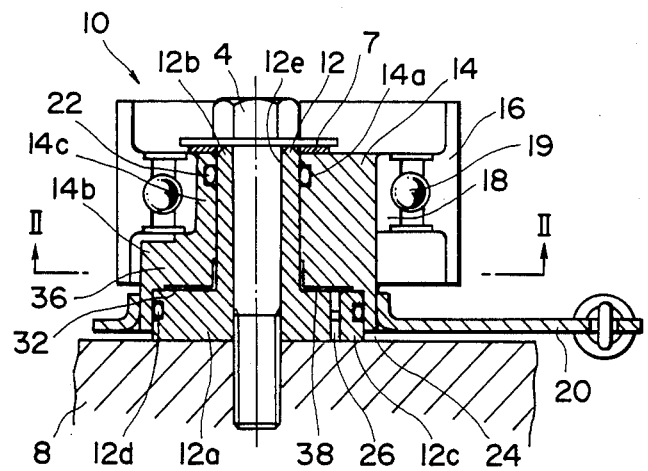
FIG. 3 is a longitudinal cross-sectional view of the first embodiment taken along line I—I of FIG. 2.

That is, the autotensioner 10 has an outer member 16 bearing against the outer periphery of the timing belt 3 and is fixed to the engine block 8 by a flanged bolt 4 through a fixed shaft 12 (see FIGS. 1 to 3). The outer member 16 has an inner race 18 interposed between it and an inner member 14 and rolling members 19 interposed between the outer member and the inner race 18, and is rotatable. A bracket 20 fixed to the inner member 14 disposed between the outer member 16 and the fixed shaft 12 extends along the engine block 8, and is biased at the end 20a thereof toward the timing belt 3 by a coil spring 5 having one end secured to a pin 6 protruding from the engine block, and the autotensioner 10 is urged against the timing belt as a whole. Accordingly, the inner member 14, the inner race 18, the rolling members 19, the outer member 16 and the bracket 20 together constitute displaceable means displaceable relative to the fixed shaft 12, which is a fixed portion, to bear against the belt. Also, the coil spring 5 acts as tension imparting means.

The fixed shaft 12 comprises a circular bottom 12a closely bearing against the engine block 8 and a cylinder portion 12b extending from the bottom 12a toward the side opposite to the engine block. The flanged bolt 4 is inserted in a hole 12e formed at the center axis of the fixed shaft 12, and the tip end of the bolt 4 is threadably engaged with the engine block 8, whereby the fixed shaft 12 is fixed to the engine block 8. The circular bottom 12a has a fine hole 12c for damper liquid overflow which will be described later, and a sealing pin 26 is inserted from the engine block 8 side into the fine hole 12c to prevent leakage of liquid. The inner member 14 is loosely fitted to the outer side of the fixed shaft 12, and the vicinity of the opposite ends of the loosely fitted portion of the two members 12 and 14 is of a seal structure for preventing leakage of damper liquid enclosed in a damper liquid enclosing chamber 32 formed between the two members 12 and 14. That is, an O-ring of rubber is disposed in a groove 12d formed in the outer periphery of the circular bottom 12a of the fixed shaft 12, and a groove 14a is formed in the inner peripheral side wherein the inner member 14 is loosely fitted to the end of the cylinder portion 12b of the fixed shaft 12 and an O-ring 22 is disposed in this groove 14a, thereby forming a seal structure.

Figure 4:
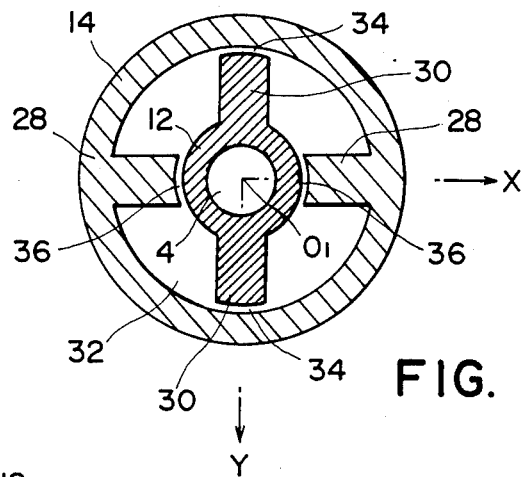
FIG. 4 is a cross-sectional view taken along line II—II of FIG. 3.
Figures 5, 6:
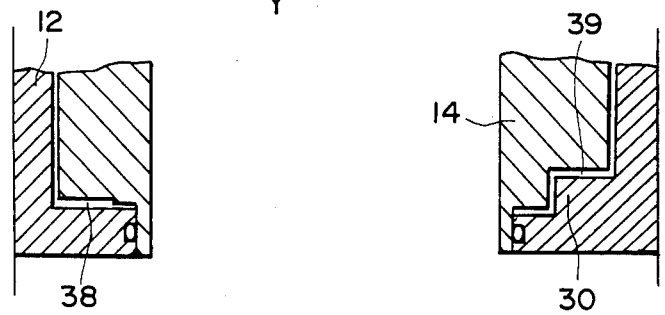
FIG. 5 is a cross-sectional view taken along line $O_1$—X of FIG. 4.
FIG. 6 is a cross-sectional view taken along line $O_1$—Y of FIG. 4.

The inner member 14 comprises a first cylindrical portion 14b and a second cylindrical portion 14c. The first cylindrical portion 14b has the same axis $O_1$ as that of the fixed shaft 12, and the second cylindrical portion 14c has an axis $O_2$ eccentric with respect to the fixed shaft 12 (see FIG. 2). The first cylindrical portion 14b is loosely fitted over the outer periphery of the circular bottom 12a of the fixed shaft 12 and defines the aforementioned annular damper liquid enclosing chamber 32 between it and the cylinder portion 12b. In the damper liquid enclosing chamber 32, as shown in FIG. 4, two inner blades 30 extend out from the fixed shaft 12 while having a relation of 180° therebetween, and two outer blades 28 extend in within the inner member 14 also while having a relation of 180° therebetween. Slight gaps are left between the blades 28, 30 and the fixed shaft 12 and the inner member 14 opposed to the blades 28, 30 to form orifices 34, 36, 38 and 39. The orifices 38 are the gaps between the outer blades 28 and the fixed shaft 12 (see FIG. 5), and the orifices 39 are the gaps between the inner blades 30 and the inner member 14 (see FIG. 6).

The damper liquid enclosing chamber 32, the inner blades 30, the outer blades 28 and the damper liquid together constitute a vibration absorbing mechanism in which the enclosing chamber is divided into several chambers. The fine hole 12c for damper liquid overflowing formed in the circular bottom 12a of the fixed shaft 12 opens in the damper liquid enclosing chamber 32. To enclose the damper liquid in the damper liquid enclosing chamber, the cylinder portion 12b of the fixed shaft 12 in its inverted state is tentatively fitted to the inner periphery of the second cylindrical portion 14c of the inner member 14, and the circular bottom 12a and the inner peripheral surface of the first cylindrical portion 14b are rendered into an unfitted state to thereby provide a space, from which the damper liquid is poured, whereafter the circular bottom 12a and the inner peripheral surface of the first cylindrical portion 14b are rendered into a predetermined fitted state.

The inner race 18 is fitted to the outer side of the second cylindrical portion 14c eccentric with respect to the first cylindrical portion 14b and the outer member 16 is disposed around the inner race 18 with the rolling members interposed therebetween. The outer member 16 is designed to bear against the timing belt 3. The bracket 20 is fixedly fitted to the outer periphery of the first cylindrical portion 14b of the inner member 14, whereby the inner member 14 and the bracket 20 are made integral with each other.

The bracket 20 has a portion extending radially outwardly along the engine block from the annular portion fitted to the inner member 14, and the coil spring 5 is secured to the end portion 20a thereof so that the bracket is biased toward the timing belt 3. A thrust plain bearing is interposed between the end of the second cylindrical portion 14c of the inner member 14 and the flange of the flanged bolt 4 to reduce the friction between the inner member and the flange. The inner member 14 is rotatable about the axis of the first cylindrical portion 14b. In this first embodiment, the inner race is fitted to the outer periphery of the inner member, but the inner race may be omitted and the outer peripheral surface of the inner member may be directly used as the race.

The autotensioner of the above-described construction, as shown in FIG. 1, is mounted on the engine block 8 and imparts a predetermined tension to the timing belt 3 by the coil spring 5.

For example, where the distance between the two timing pulleys 1 and 2 is greater than the contraction of the timing belt 3 during low temperatures, the tension of the timing belt 3 is gradually reduced. At such time, the biasing force of the coil spring 5 rotatively displaces the inner member 14 and the outer member 16 relative to the fixed shaft 12 through the bracket 20 in a direction to make up for the tension of the timing belt 3. At this time, the damper liquid in the damper liquid enclosing chamber 32 gradually flows through the orifices 34, 36, 38 and 39 to stop the inner member 14 and the outer member 16 at a position in which the fluctuation of the tension of the timing belt 3 has been absorbed.

Conversely, during high temperatures, the expansion of the distance between the timing pulleys 1 and 2 exceeds the expansion of the timing belt 3 and therefore, the tension of the timing belt 3 increases. At this time, the timing belt 3 displaces the outer member 16 and the inner member 14 in the opposite direction, and the damper liquid gradually flows in the direction opposite to that during low temperatures and becomes balanced with the biasing force of the coil spring 5.

Next, when an excessively great load is momentarily applied to the timing belt 3 during the starting or sudden stoppage of the engine, the timing belt 3 tries to displace the outer member 16 and the inner member 14. However the damper liquid in the damper liquid enclosing chamber 32 cannot abruptly flow, but only flows slightly from the orifices 34, 36, 38 and 39 and therefore, the displacement of the members 16 and 14 can be minimized. Also, the excessively great load returns the inner member 14 and the outer member 16 to a predetermined tension imparting position on the spot. When an increased tension continues, the damper liquid flows little by little through the orifices 34, 36, 38 and 39 into the adjacent chambers, and at a position in which the tension of the timing belt 3 is balanced with the biasing force of the coil spring 5, the two members 14 and 16 are stopped.

When the load to the timing belt 3 fluctuates so as to vibrate the timing belt 3 and cause fluctuation of the tension thereof, only a small amount of damper liquid passes through the orifices 34, 36, 38 and 39 and therefore, the vibration can be absorbed. Accordingly, even when the tension fluctuates suddenly, it is possible to impart a stable tension to the timing belt 3.

Figures 7, 8:
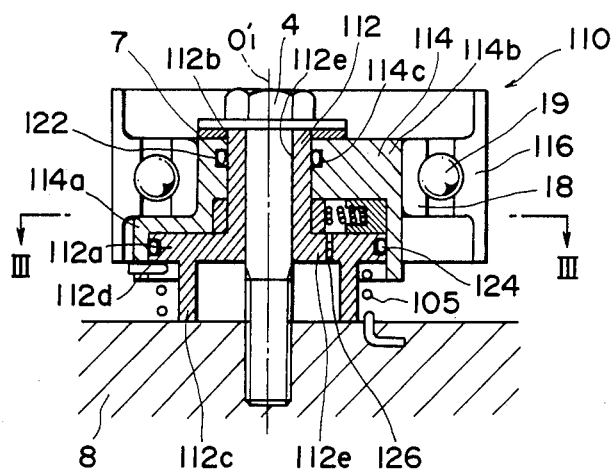
FIG. 7 is a longitudinal cross-sectional view of an autotensioner according to a second embodiment of the present invention taken along line I—I of FIG. 2.
FIG. 8 is a cross-sectional view taken along line III—III of FIG. 7.

An autotensioner 110 according to a second embodiment of the present invention will now be described with respect chiefly to the differences thereof from the first embodiment by reference to FIGS. 7 and 8.

A fixed shaft 112 comprises, in succession from the engine block 8 side, a second cylinder portion 112c, a disk portion 112a and a first cylinder portion 112b. The fixed shaft 112 has a hole 112c extending through the center thereof and is fixed to the engine block by a flanged bolt 4. As in the first embodiment, an inner member 114 is loosely fitted to the outer side of the fixed shaft 112, and an outer member 116 is rotatably disposed around the inner member 114 with an inner race 18 and rolling members 19 interposed therebetween.

The inner member 114, the inner race 18, the rolling members 19 and the outer member 116 together constitute displaceable means displaceable relative to the fixed shaft 112 to bear against the belt.

The inner member 114 comprises a first cylinder portion 114a covering a part of the disk portion 112a and the second cylinder portion 112c of the fixed shaft 112, and a second cylinder portion 114b covering the first cylinder portion 112b of the fixed shaft 112. The first cylinder portion 114a has the same axis $O'_1$ as that of the bolt 4, while the second cylinder portion 114b has an axis $O'_2$ eccentric with respect to the axis of the bolt 4. An annular damper liquid enclosing chamber 132 is defined between the fixed shaft 112 and the inner member 114.

Damper liquid, a vane support member 130, a spring 140 and a vane 128 are provided in the damper liquid enclosing chamber 132, and they constitute a vibration absorbing mechanism.

The vane support member 130 is fixedly fitted on the first cylinder portion 112b of the fixed shaft 112. The vane support member 130 is oval and forms an orifice 134 adjacent to the inner member 114 at a part of the circular portion thereof. A recess 130a is formed in the protruded end of the vane support member 130, and the vane 128 biased outwardly by a spring 140 is disposed in the recess 130a for sliding movement relative to the inner member 114.

A fine hole 112e for damper liquid overflow formed in the disk portion 112a of the fixed shaft 112 opens into the damper liquid enclosing chamber 132. The method of pouring the damper liquid into the damper liquid enclosing chamber is similar to that described in connection with the first embodiment and therefore need not be described. A pin 126 is for sealing the fine hole 112e. O-rings 124 and 122 are disposed in the outer peripheral groove 112d of the disk portion 112a of the fixed shaft 112 and the inner peripheral groove 114c of the inner member 114, respectively, to completely seal the damper liquid.

One end of a coil spring 105 as tension imparting means is secured to that end of the first cylinder portion 114a of the inner member 114 which is adjacent to the engine block 8. The other end of the coil spring 105 is secured to the engine block 8 and therefore, the biasing force thereof is imparted so as to rotate the inner member 114 in the circumferential direction.

The outer member 116 is rotatably disposed around the inner member 114 with an inner race and rolling members interposed therebetween, the inner race being fitted to the outer side of the second cylinder portion 114b of the inner member 114. The outer member 116 and the inner member 114 are designed so as to be rotatable as a unit relative to the fixed shaft 112, and are always urged toward the timing belt 3 by the coil spring 105.

Again in this embodiment, as in the first embodiment, the outer periphery of the inner member may be directly used as the race.

In the timing belt 3 to which the above-described autotensioner 110 of the second embodiment is applied, when the tension thereof fluctuates, the damper liquid flows slightly through the orifice 134 between a portion of the vane support member 130 and the inner member 114 and in addition, circulates while forcing the vane 128 into the vane support member 130 against the biasing force of a spring 140. Accordingly, the autotensioner 110 according to the present embodiment can also impart a predetermined tension slowly following the slow fluctuation of the tension of the timing belt 3 while, on the other hand, it can minimize the displacement of the tensioner for sudden fluctuation of the tension and maintain a stable tension.

Although the autotensioners 10 and 110 according to the first and second embodiments of the present invention have been described with respect to the case where they are applied to the timing belt of the OHC engine, the autotensioner of the present invention is readily applicable to any belt driven while having a predetermined tension.

Also, while the first and second embodiments have been described with respect to the case where liquid is enclosed in the damper liquid enclosing chamber, this is not restrictive, and the liquid may be replaced by gas or other fluid.

Reference is now had to FIGS. 9 to 13 to describe third and fourth embodiments of the present invention provided with elastic vibration absorbing means utilizing an elastic force.

Each of autotensioners 310 and 410 according to the third and fourth embodiments has an outer race 16 bearing against the outer periphery of the timing belt 3 and is fixed to the engine block 8 by a flanged bolt 4 through a fixed shaft 312, 412 (see FIGS. 1, 2, 9 and 12). The outer race 16 which provides the rotating side has an inner race 18 interposed between it and an oscillating sleeve 314, 414 and rolling members 19 interposed between the outer race 16 and the inner race 18, and is rotatable. A bracket 20 fixed to the oscillating sleeve 314, 414 disposed between the outer race 16 and the fixed shaft 312, 412 extends along the engine block 8 and at the end 20a thereof, it is biased toward the timing belt 3 by a coil spring 5 having one end secured to a pin 6 protruding from the engine block 8, and the autotensioner 310, 410 is urged against the timing belt 3 as a whole. Accordingly, the oscillating sleeve 314, 414, the inner race 18, the rolling members 19, the outer race 16 and the bracket 20 together constitute displaceable means displaceable relative to the fixed shaft 312, 412 which is a fixed portion to bear against the belt. The coil spring 5 acts as tension imparting means.

While the outer race 16 is shown as integrally having a portion bearing against the timing belt 3 and a portion providing the outer track of the rolling members 19, said two portions may be separate from each other and may be constructed as a bearing outer race and a pulley for the belt outside the outer race.

The fixed shaft 312, 412 comprises a circular bottom 312a, 412a closely bearing against the engine block 8 and a cylinder portion 312b, 412b extending out from the circular bottom 312a, 412a toward the side opposite to the engine block. A flanged bolt 4 is inserted in a hole 312e, 412e formed along the center axis of the fixed shaft 312, 412, and the tip end of the bolt 4 is threadably engaged with the engine block 8, whereby the fixed shaft 312, 412 is fixed to the engine block 8.

The oscillating sleeve 314, 414 comprises a first cylindrical portion 314b, 414b and a second cylindrical portion 314c, 414c. The first cylindrical portion 314b, 414b has the same axis $O_1$ as that of the fixed shaft 312, 412, and the second cylindrical portion 314c, 414c has an axis $O_2$ eccentric with respect to the fixed shaft 312, 412. The first cylindrical portion 314b, 414b is loosely fitted over the outer periphery of the circular bottom 312a, 412a through a radial plain bearing 322, 422 and defines two semiannular chambers 332, 432 between it and the cylinder portion 312b, 412b. A thrust plain bearing 307, 407 is interposed between the end of the second cylindrical portion 314c, 414c of the oscillating sleeve 314, 414 and the flange of the flanged bolt 4 to reduce the friction between the oscillating sleeve and the flange. Accordingly, the oscillating sleeve 314, 414 can rotate about the axis of the first cylindrical portion 314b, 414b.

Elastic vibration absorbing means is disposed in the chamber 332, 432 and provides an elastic force which resists the rotation of the oscillating sleeve 314, 414 relative to the fixed shaft 312, 412. FIGS. 9 to 11 show a first embodiment of the elastic vibration absorbing means, and FIGS. 12 and 13 show a second embodiment of the elastic vibration absorbing means.

In the third embodiment of the present invention shown in FIGS. 9 to 11, elastic members 334 formed of an elastomer material such as rubber or plastics are disposed in the chamber 332. The chamber 332, as shown in FIG. 11, is formed as two arcuate chambers by projections 312c and 314a extending from the fixed shaft 312 and the oscillating sleeve 314 into an annular chamber defined between the two members 312 and 314. The two elastic members 334 are inserted in these arcuate chambers 332 and are of a shape which elastically resists the displacement of the oscillating sleeve 314.

Figure 12:
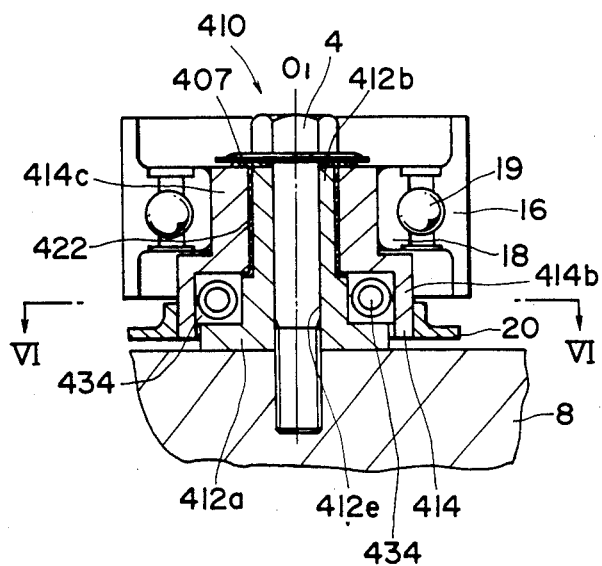
FIG. 12 is a cross-sectional view of a fourth embodiment of the present invention taken along line IV—IV of FIG. 2.
Figure 13:
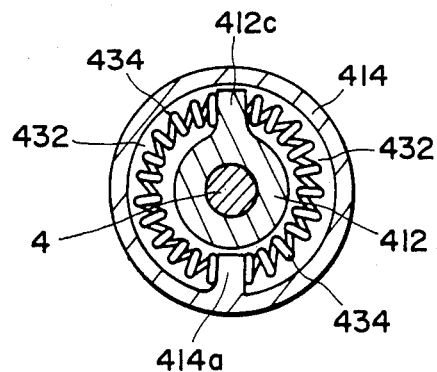
FIG. 13 is a cross-sectional view taken along line VI—VI of FIG. 12.

In the autotensioner 410 according to the fourth embodiment of the present invention showing the second embodiment of the elastic vibration absorbing means of FIGS. 12 and 13, two coil springs 434 are disposed in respective chambers 432. The opposite ends of each coil spring 434 are urged against the fixed shaft 412 and the projection of the oscillating sleeve 414, respectively, and produce an elastic force resisting the rotative displacement of the oscillating sleeve 414.

The elastic vibration absorbing means is not limited to coil springs, but may be plate springs or other springs.

Operation of the autotensioners 310, 410 according to the third and fourth embodiments mounted as described above will now be described.

The tension of the belt 3 imparted by the coil spring 5 is transmitted and loaded to the radial plain bearing 322, 422 and the fixed shaft 312, 412 through the outer race 16, the rolling members 19, the inner race 18 and the oscillating sleeve 314, 414. Accordingly, tension of the belt is not loaded to the elastic members 334, 434 which are elastic vibration absorbing means.

When the load to the belt 3 fluctuates and the belt 3 vibrates so as to cause fluctuation of the tension thereof or when fluctuation of the tension is caused by a temperature change, the coil spring 5 expands and contracts to absorb the vibration and the expansion and contraction of the coil spring 5 is transmitted through the bracket 20, and the oscillating sleeve 314, 414 is rotatively displaced relative to the fixed shaft 312, 412. At this time, the elastic members 334 or the coil springs 434 are subjected to a compressing or expanding force and elastically absorb the force.

Figure 14:
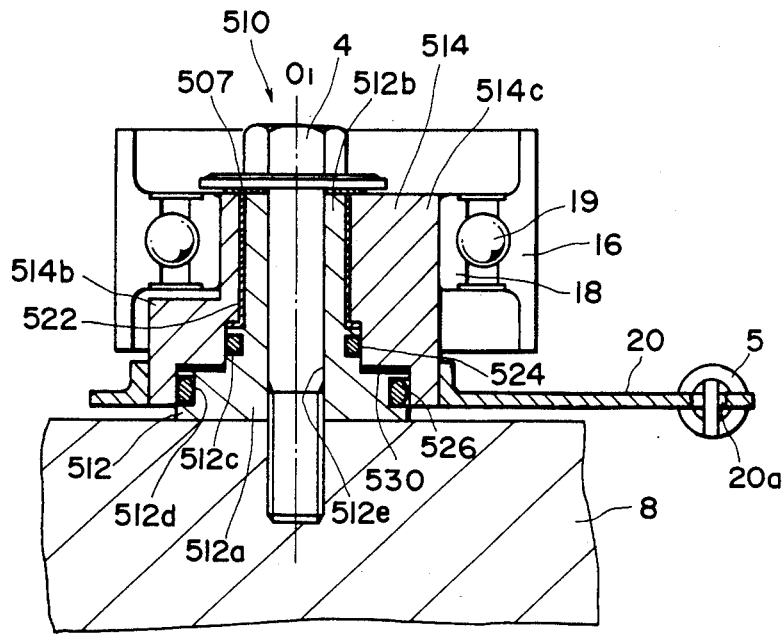
FIGS. 14, 15 and 16 are cross-sectional views of fifth, sixth and seventh embodiments, respectively, of the autotensioner according to the present invention taken along line I—I of FIG. 2.
Figure 15:
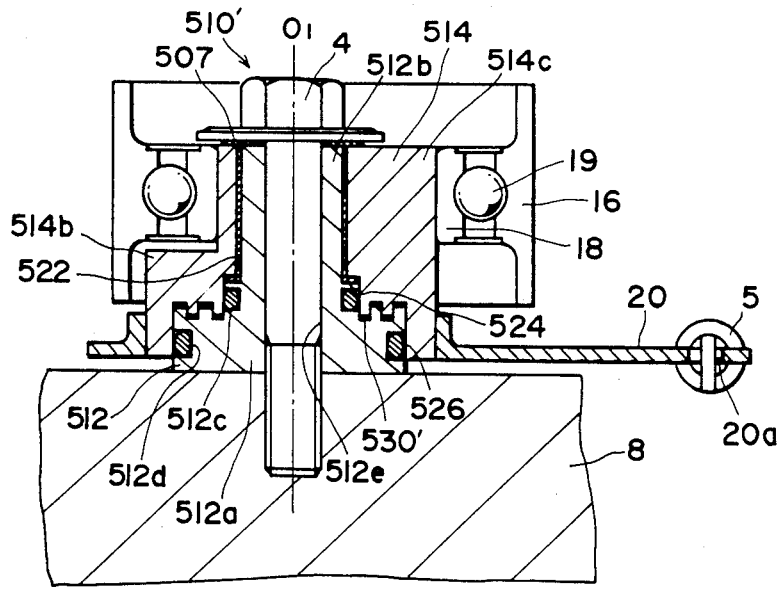
Figure 16:
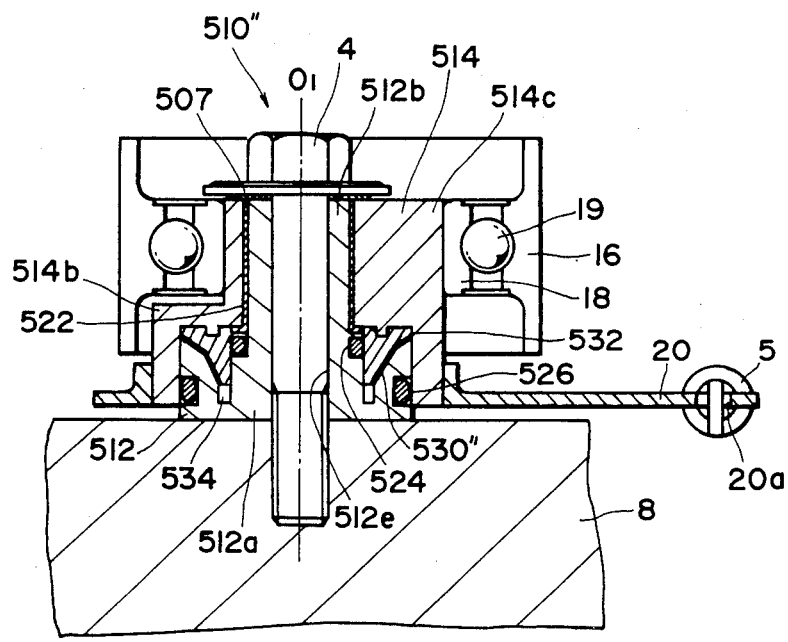

FIGS. 14, 15 and 16 show fifth, sixth and seventh embodiments, respectively, of the present invention. The differences between the fifth, sixth and seventh embodiments are the shape and construction of a chamber 530, 530' or 530" provided between the circular bottom 512a of a fixed shaft 512 and a first cylindrical portion 514b of an oscillating sleeve 514. Chiefly the differences between these embodiments will hereinafter be described. In these embodiments, members similar to those in the aforedescribed first to fourth embodiments are given similar reference numerals and need not be described.

In FIG. 14 which shows the fifth embodiment, the first cylindrical portion 514b is loosely fitted over the outer periphery of the circular bottom 512a of the fixed shaft 512 through a radial plain bearing 522 and defines an annular chamber 530 between it and the circular bottom 512a. A thrust plain bearing 507 is interposed between the end of a second cylindrical portion 514c of the oscillating sleeve 514 and the flange of the flanged bolt 4 to reduce the friction between the oscillating sleeve and the flange. Accordingly, the oscillating sleeve 514 can rotate about the axis $O_1$ of the first cylindrical portion 514b.

Fluid viscosity vibration absorbing means is provided in the annular chamber 530 to provide a viscosity resistance force which resists the rotation of the oscillating sleeve 514 relative to the fixed shaft 512. That is, fluid having viscosity, such as silicone oil, is enclosed in the chamber 530, and on the upper and lower sides of the chamber 530, the fluid is sealed by seal rings 524 and 526 disposed in grooves 512c and 512d formed in the side surface of the fixed shaft 512. The sealed fluid provides a viscosity resistance to the displacement of the oscillating sleeve 514 relative to the fixed shaft 512, thereby alleviating any sudden displacement.

In the autotensioner 510' according to the sixth embodiment shown in FIG. 15, the chamber 530' between the seal rings 524 and 526 is made concavo-convex to thereby increase the space between the fixed shaft 512 and the oscillating sleeve 514. By thus making the chamber 530' concavo-convex to thereby increase the area of contact with the viscous fluid, the resultant viscosity resistance, i.e., the tension fluctuation absorbing effect, is increased. That is, the viscosity resistance is proportional to the area of contact and therefore, if a great area of contact is secured, a predetermined effect will be obtained even if the gap between the sliding surfaces is made great, and this leads to an advantage that it becomes unnecessary to work the sliding surfaces highly accurately.

In the present embodiment, the concavo-convexity of the chamber 530' is directly formed between the fixed shaft 512 and the oscillating sleeve 514, but alternatively, these concave and convex portions may be discretely formed by a material such as plastics and assembled together and used.

In the seventh embodiment shown in FIG. 16, a projected member 532 made of resin is fixed to the lumen of the first cylindrical portion 514b of the oscillating sleeve 514. The projected member 532 has a central cylindrical surface which is in contact with the upright surface of the circular bottom 512a of the fixed shaft 512, a bottom surface which is in contact with the bottom surface of the lumen of the oscillating sleeve 514, and an inverted conical outer side surface. The circular bottom 512a of the fixed shaft 512 is formed with a predetermined gap with respect to said inverted conical outer side surface, and a chamber 530" is provided. The lower end of the chamber 530" opens to an oil sump 534 formed between the circular bottom 512a and the projected member 532. A seal ring 524 is provided between the projected member 532 and the fixed shaft 512 and a seal ring 526 is provided between the fixed shaft 512 and the oscillating sleeve 514, thereby sealing the chamber 530". As in the previously described embodiment, viscous fluid is enclosed in the chamber 530", but the internal pressure in the chamber 530" does not extremely rise because the volume-expanded portion of the fluid resulting from temperature rise flows into the oil sump 534.

Operation of the autotensioners 510, 510', and 510" according to the fifth to seventh embodiment will now be described.

The tension of the belt 3 imparted by the coil spring 5 is transmitted and loaded to the radial plain bearing 522 and the fixed shaft 512 through the outer race 16, the rolling balls 19, the inner race 18 and the oscillating sleeve 514. Accordingly, the tension of the belt is not loaded to the fluid in the chamber 530, 530' or 530" which is fluid viscosity vibration absorbing means.

When the belt 3 is vibrated by fluctuation of the load to the belt 3 so as to fluctuate the tension of the belt or where fluctuation of the tension of the belt is caused by a temperature change, the coil spring 5 expands and contracts to absorb the fluctuation of the tension. Also, the shocking vibration during the starting and stoppage of the engine or the fine vibration during the operation of the engine is absorbed by the fluid in the chamber 530, 530' or 530" which is fluid viscosity vibration absorbing means.

According to the constructions of the fifth to seventh embodiments, the load in the thrust direction is loaded by the thrust plain bearing 7 and the radial plain bearing 522 and therefore, the gap between and the coarseness of the opposed surfaces of the fixed shaft 512 and the oscillating sleeve 514 which form the chamber 530, 530' or 530" can be adjusted freely and in addition, the viscosity of the fluid can be selected freely and therefore, the viscosity resistance of the fluid viscosity vibration absorbing means can be set substantially to any value.

The chamber 530, 530', 530" is formed between the fixed shaft 512 and the oscillating sleeve 514, but alternatively, it may be provided between a portion of the radial plain bearing 522 and the oscillating sleeve 14.

We claim:

1. An autotensioner for a timing belt of an engine, comprising:
   a stationary portion fixed to an engine block;
   displaceable means supported for rocking movement about an axis of said stationary portion and having a cylindrical outer member surrounding said stationary portion and rotatable about an axis offset from the first-mentioned axis, said outer member engaging said timing belt so as to rotate upon operation of said timing belt;
   tension imparting means for biasing said displaceable means to impart a predetermined tension to the belt; and
   vibration absorbing means provided between said fixed portion and said displaceble means so as to absorb fluctuation of the tension of the belt.

2. An autotensioner according to claim 1, wherein said vibration absorbing means comprises:
   a hermetically sealed chamber formed between said fixed portion and said displaceable means;
   fluid enclosed in said hermetically sealed chamber;
   defining means for dividing said hermetically sealed chamber into a plurality of chambers; and
   communicating means for enabling a minute amount of circulation of the fluid between said plurality of chambers.

3. An autotensioner according to claim 2, wherein said defining means comprises a protruding portion protruding from said fixed portion into said hermetically sealed chamber, and a protruding portion protruding from said displaceable means into said hermetically sealed chamber, and said communicating means comprises an orifice formed between said two protruding portions and said fixed portion or said displaceable means.

4. An autotensioner according to claim 2, wherein said defining means comprises a vane support member fitted on a fixed shaft in said hermetically sealed chamber and bearing against said displaceable means at least one location, and a vane held on said vane support member while being biased toward said displaceable means, and said communicating means comprises an orifice formed between said displaceable means and said vane support member.

5. An autotensioner according to claim 1, wherein said tension imparting means absorbs part of the fluctuation of the tesnion of the belt, and wherein said autotensioner further comprises plain bearing means for enabling the displacement of said displaceable means relative to said fixed portion and loading the reaction force of the tension of the belt, said vibration absorbing means elastically absorbing part of the fluctuation of the tension of the belt.

6. An autotensioner according to claim 5, wherein said plain bearing means comprises a radial plain bearing and a thrust plain bearing disposed between said fixed portion and said displaceable means.

7. An autotensioner according to claim 5, wherein said vibration absorbing means is formed of an elastomer material.

8. An autotensioner according to claim 5, wherein said vibration absorbing means is a spring.

9. An autotensioner for a timing belt of an engine, comprising:
 a stationary portion fixed to an engine block;
 displaceable means supported for rocking movement about an axis of said stationary portion and having a cylindrical outer member surrounding said stationary portion and rotatable about an axis offset from the first-mentioned axis, said outer member engaging said timing belt so as to rotate upon operation of said timing belt;
 tension imparting means for biasing said displaceable means to impart a predetermined tension to the belt and absorbing part of the fluctuation of the tension;
 plain bearing means for enabling the displacement of said displaceable means relative to said fixed portion and loading the reaction force of the tension of the belt; and
 fluid viscosity vibration absorbing means for absorbing part of the fluctuation of the tension of the belt by the utilization of the viscosity of fluid enclosed in a gap between said fixed portion and said displaceable means.

10. An autotensioner according to claim 9, wherein said fluid is silicone oil.

11. An autotensioner according to claim 9, wherein said plain bearing means comprises a radial plain bearing and a thrust plain bearing disposed between said fixed portion and said displaceable means.

12. An autotensioner according to claim 1, wherein said tension imparting means comprises a coil spring substantially coaxial with said stationary portion.

* * * * *